(12) United States Patent
Chan

(10) Patent No.: US 7,380,995 B2
(45) Date of Patent: Jun. 3, 2008

(54) LATCHING MECHANISM FOR PLUGGABLE TRANSCEIVER

(75) Inventor: Seng-Kum Chan, Santa Clara, CA (US)

(73) Assignee: Emcore Corporation, Albuquerque, NM (US)

( * ) Notice: Subject to any disclaimer, the term of this patent is extended or adjusted under 35 U.S.C. 154(b) by 0 days.

(21) Appl. No.: 11/305,883

(22) Filed: Dec. 19, 2005

(65) Prior Publication Data

US 2007/0140626 A1 Jun. 21, 2007

(51) Int. Cl.
*G02B 6/36* (2006.01)

(52) U.S. Cl. .............................. 385/92; 385/88; 385/90; 385/91; 385/53; 439/372; 439/577; 361/728; 361/732

(58) Field of Classification Search ................ 361/728, 361/732, 730; 385/88–92, 53; 439/372, 439/577

See application file for complete search history.

(56) References Cited

U.S. PATENT DOCUMENTS

| | | | |
|---|---|---|---|
| 5,083,945 A | 1/1992 | Miskin et al. | |
| 5,352,133 A | 10/1994 | Sampson | |
| 5,522,731 A | 6/1996 | Clark et al. | |
| 5,857,049 A | 1/1999 | Beranck et al. | |
| 6,179,627 B1 | 1/2001 | Daly et al. | |
| 6,220,873 B1 | 4/2001 | Samela et al. | |
| 6,439,918 B1 | 8/2002 | Togami | |
| 6,762,940 B2 * | 7/2004 | Zaremba | 361/728 |
| 6,851,867 B2 * | 2/2005 | Pang et al. | 385/88 |
| 6,935,882 B2 * | 8/2005 | Hanley et al. | 439/372 |
| D513,252 S | 12/2005 | Wang et al. | |
| 2002/0009905 A1 | 1/2002 | Poplawski et al. | |
| 2002/0018625 A1 | 2/2002 | Grann et al. | |
| 2002/0106926 A1 | 8/2002 | Lindberg et al. | |
| 2002/0142634 A1 | 10/2002 | Poplawski et al. | |
| 2003/0104725 A1 | 6/2003 | Kerlin et al. | |
| 2003/0181098 A1 | 9/2003 | Kropp et al. | |
| 2003/0198025 A1 * | 10/2003 | Cao | 361/728 |
| 2003/0198029 A1 | 10/2003 | Zaremba | |
| 2003/0206403 A1 | 11/2003 | Zaremba | |
| 2003/0223708 A1 | 12/2003 | Kurashima et al. | |
| 2003/0236019 A1 | 12/2003 | Hanley et al. | |
| 2004/0037537 A1 | 2/2004 | Chown | |
| 2004/0127102 A1 | 7/2004 | Poplawski | |
| 2004/0156595 A1 | 8/2004 | Stockhaus et al. | |
| 2004/0156598 A1 | 8/2004 | Shih | |
| 2004/0247250 A1 | 12/2004 | Lee | |
| 2004/0264876 A1 | 12/2004 | Posamentier | |
| 2005/0018979 A1 | 1/2005 | Mizue et al. | |
| 2005/0041407 A1 | 2/2005 | Torres et al. | |
| 2005/0041933 A1 | 2/2005 | Meadowcroft et al. | |
| 2005/0117913 A1 | 6/2005 | Hung et al. | |
| 2005/0196109 A1 | 9/2005 | Kim et al. | |

* cited by examiner

*Primary Examiner*—Brian Healy
*Assistant Examiner*—Guy G Anderson

(57) ABSTRACT

A pluggable connector, such as an optical transceiver is provided for coupling an information system unit to a fiber optical cable. The connector includes a housing, a moveable collar disposed on an optical connector end of the housing, said collar surrounding an optical connector, a cam connected to said moveable collar and a spring loaded latch extending from a side of said housing for engaging a receptacle on the information system unit so as to secure the connector in the receptacle, said cam engaging the spring loaded latch such that when the moveable collar is pulled in a direction away from the housing the latch is retracted to enable the connector to be released from the receptacle.

20 Claims, 6 Drawing Sheets

LATCHING MECHANISM FOR PLUGGABLE TRANSCEIVER

REFERENCE TO RELATED APPLICATIONS

This application is related to copending U.S. patent application Ser. No. 10/879,775 filed Jun. 28, 2004, assigned to the common assignee.

BACKGROUND OF THE INVENTION

1. Field of the Invention

The field of the invention relates to optical transceivers, and in particular to the latching mechanism for a pluggable assembly or module that provides a communications interface between a computer or communications unit having an electrical input/output connector or interface and an optical fiber, such as used in fiber optic communication links.

2. Description of the Related Art

A variety of optical transceivers are known in the art which include an optical transmit portion that converts an electrical signal into a modulated light beam that is coupled to an optical fiber, and a receive portion that receives an optical signal from an optical fiber and converts it into an electrical signal. Traditionally, an optical receive section includes an optical assembly to focus or direct the light from the optical fiber onto a photodector, which in turn, is connected to an amplifier/limiter circuit on a circuit board. The optical transmit portion contains a photodiode and similar optical provisions and, in turn, is coupled to a driver board.

The photodetector or photodiode is typically packaged in a hermetically sealed package in order to protect it from harsh environmental conditions. The photodetectors or photodiodes are semiconductor chips that are typically a few hundred microns to a couple of millimeters wide and 100-500 microns thick. The package in which they are mounted is typically 3 to 6 mm in diameter and 2 to 5 mm tall and has several electrical leads coming out of the package which are, in turn, soldered to the circuit board containing the amplifier/limiter or driver.

Optical transceivers are packaged in a number of standard form factors. Standard form factors provide standardized dimensions and input/output layouts that allow devices from different manufacturers to be used interchangeably.

Although these conventional pluggable designs have been used successfully in the past, they tend to be unsuitable for miniaturization which is an ever-constant objective in the industry. It is desirable to miniaturize transceivers in order to increase the port density associated with the network connection, such as, for example, switch boxes, cabling patch panels, wiring closets, and computer I/O. Recently, a new standard (i.e., the IEEE 802.3ak standard, X2 package multi-source agreement, and PCI card height requirements enabling new 10 gigabit enterprise data center, server and network attached storage connections) has been promulgated which specifies a predetermined enclosure height and width and a minimum of 20 electrical input/output connections. In addition to miniaturizing the module, it is also desirable to increase its operating frequency. For example, applications are quickly moving from the sub-gigabit realm to well over a gigabit. Conventional pluggable module configurations, however, cannot meet these parameters.

Miniaturizing a module while maintaining or even increasing its operating speed, presents a number of design problems particularly in applications in which data transmission rates are high,.e.g., in the range of 1-10 Gbs (Gigabits/second). Of particular concern is reducing electromagnetic inference (EMI) emissions.

SUMMARY OF THE INVENTION

It is an object of the present invention to provide an improved optical transceiver using a latching mechanism.

It is also an object of the present invention to provide an optical transceiver for use in an optical transmission system with an industry standard X2, XFP, or XENPAK housing.

These and other objects are provided by a pluggable connector, such as an optical transceiver, that is provided for coupling an information system unit to a fiber optical cable. The connector includes a housing, a moveable collar disposed on an optical connector end of the housing, said collar surrounding an optical connector, a cam connected to said moveable collar and a spring loaded latch extending from a side of said housing for engaging a receptacle on the information system unit so as to secure the connector in the receptacle, said cam engaging the spring loaded latch such that when the moveable collar is pulled in a direction away from the housing the latch is retracted to enable the connector to be released from the receptacle.

DETAILED DESCRIPTION OF AN ILLUSTRATED EMBODIMENT

Figure 1:
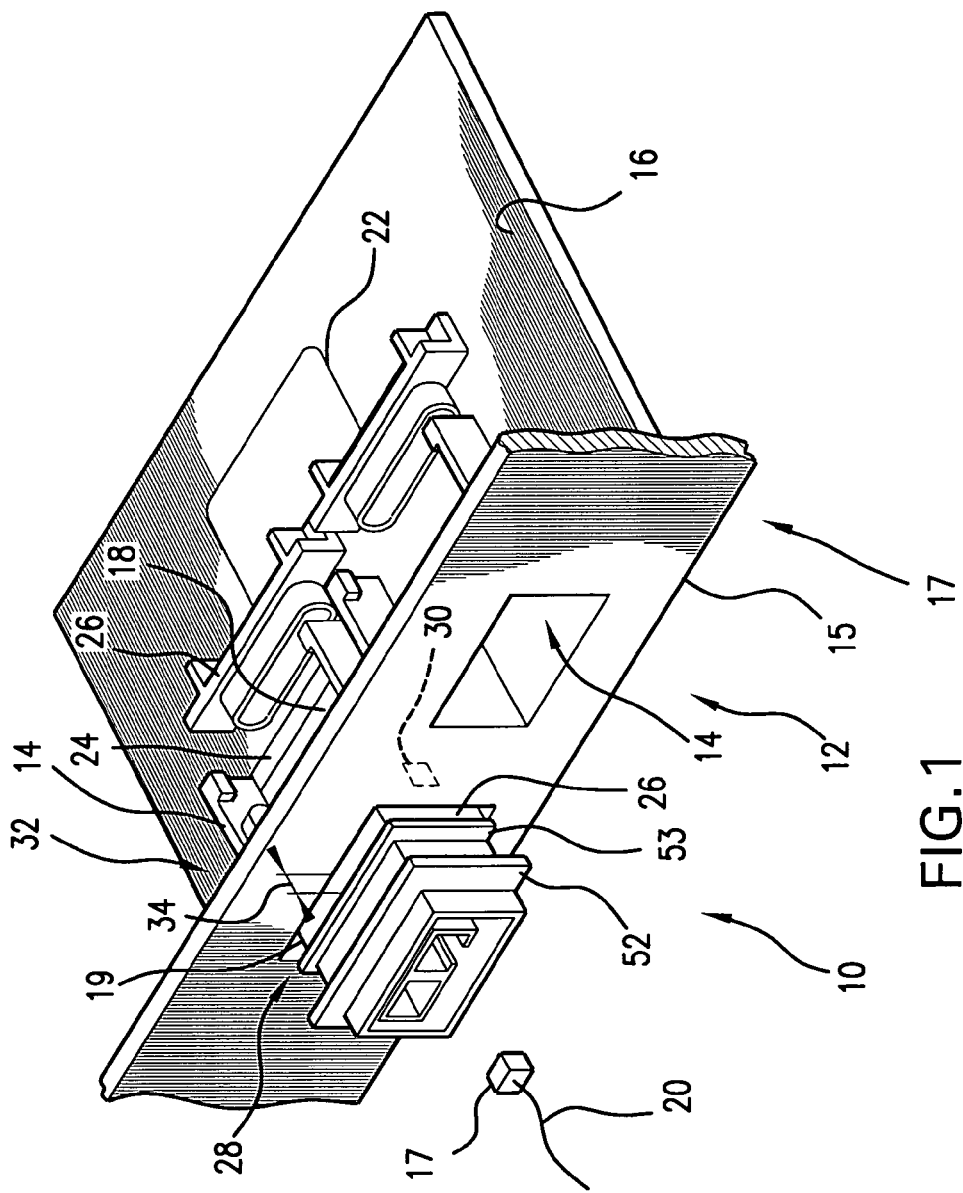
FIG. 1 is a side, perspective view of an information system in accordance with an illustrated embodiment of the invention.

FIG. 1 is a side, perspective view of an information system (e.g., an optical interface system unit) 10 shown generally in accordance with an illustrated embodiment of the invention. Included within the optical interface system 10 may be one or more receptacles 14 for receiving pluggable connectors (e.g., optical interface modules or circuit boards conforming to the IEEE 802.3ak standard, X2 package multi-source agreement, and PCI card height requirements enabling new 10 gigabit enterprise data center, server and network attached storage connections) 18.

The optical interface system 10 may be coupled to a motherboard 16 located within a chassis 15 of a host (e.g., a computer, router, etc.) 17. The motherboard 16 may include a computer bus 22 that connects the receptacles 14 to information processing functions of the host 17. A male electrical connector 24 on the back of each optical module 18 may be used to couple information between the optical transceiver 18 and a female electrical connector 26 attached to the bus 22 of the motherboard 16.

The optical interface module 18 functions to couple information streams between an optical transmission communication format (e.g., under a SONET format) within optical fiber 20 and an electrical transmission format within the bus 22. In this regard, the optical interface module 18 functions only to convert information streams from one form to another, not to change such streams except to the extent required by the particular protocol conversion involved.

Figure 6:
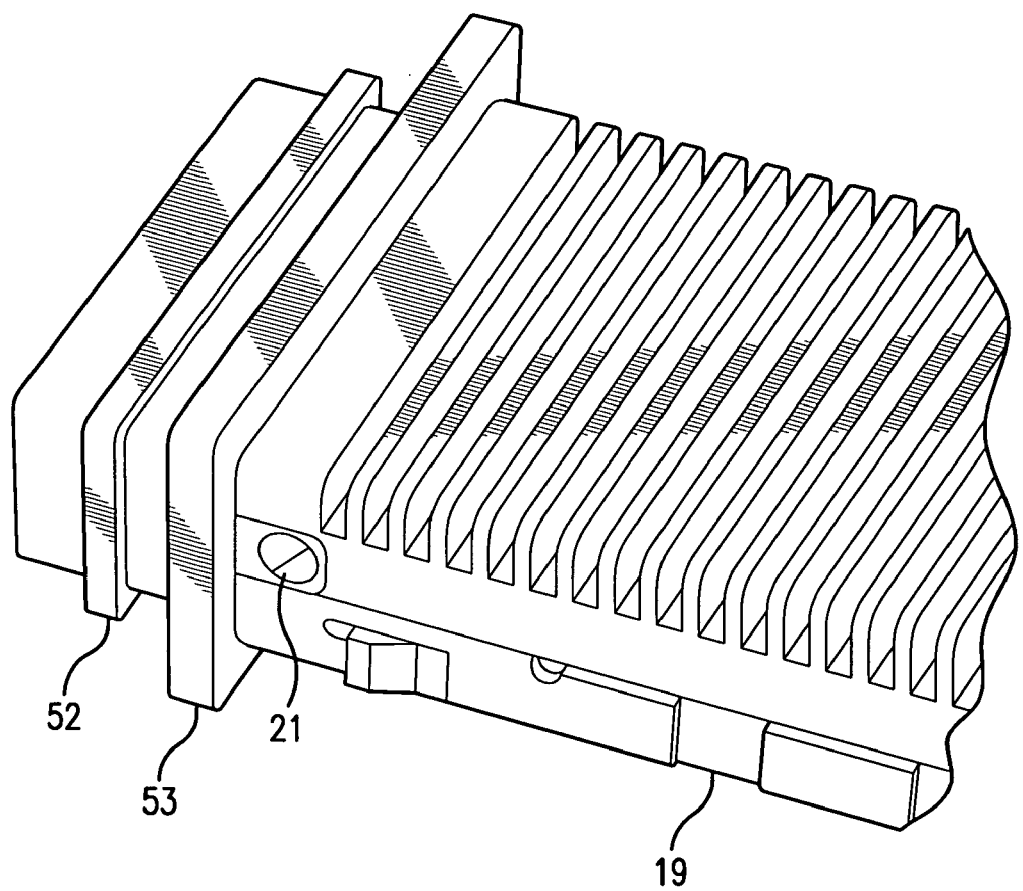
FIG. 6 is a side perspective view of the pluggable module of FIG. 2.

As shown in FIGS. 1 and 6, the interface module 18 includes a housing 19 and a faceplate 53 rigidly attached to a front edge of the housing 19 of the interface module 18 via a pair of screws 21. A moveable collar 52 extends from a front of the module 18 and functions to protect one or more optical fibers 20 and their connections (e.g., SC connector 17) with the module 18.

Figure 7:
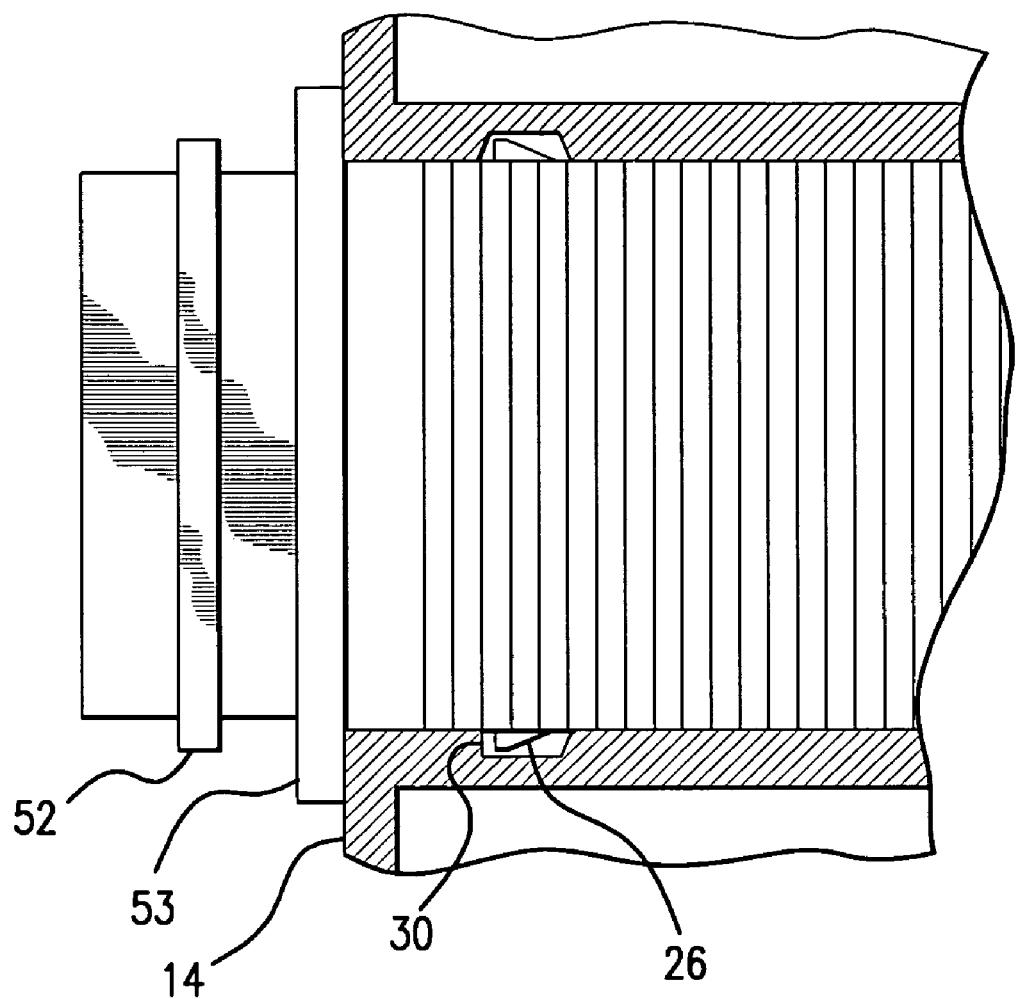
FIG. 7 is a cut-away top view of the pluggable module and receptacle of FIG. 1.

The interface module 18 may be inserted into the receptacle 14 by urging the interface module 18 along axis 34 into the receptacle 14 until the connector 24 engages the mating connector 26. Once inserted into the receptacle 14, an inclined leading edge 45 on each of a set of latches 26, 28 engages a respective electrically conductive latch tab 31, 33 of the housing 19 that deflects the latches 26, 28 into the housing until such time as the latches 26, 28 encounter a set of apertures (a forward surface of which forms strike plates 30, 32) in opposing side walls of the receptacle 14. When the latches 26, 28 encounter the apertures of the strike plates 30, 32, the latches 26, 28 extend into the apertures and engage the strike plates 30, 32 thereby locking the module 18 into the receptacle 14, as shown in FIG. 7.

To release the interface module 18 from the receptacle 14, a user may grasp a collar 52 on the interface module 18 and urge the collar 52 in a direction away from the equipment rack 12. Urging the collar 52 in a direction away from the equipment rack 12 first causes the collar 52 to move a short distance relative to the faceplate 53 of the housing 19 of the interface module 18 thereby releasing the latch 26, 28. Continued urging on the collar 52 allows the interface module 18 to be dislodged and pulled out of the receptacle 14.

Figure 2:
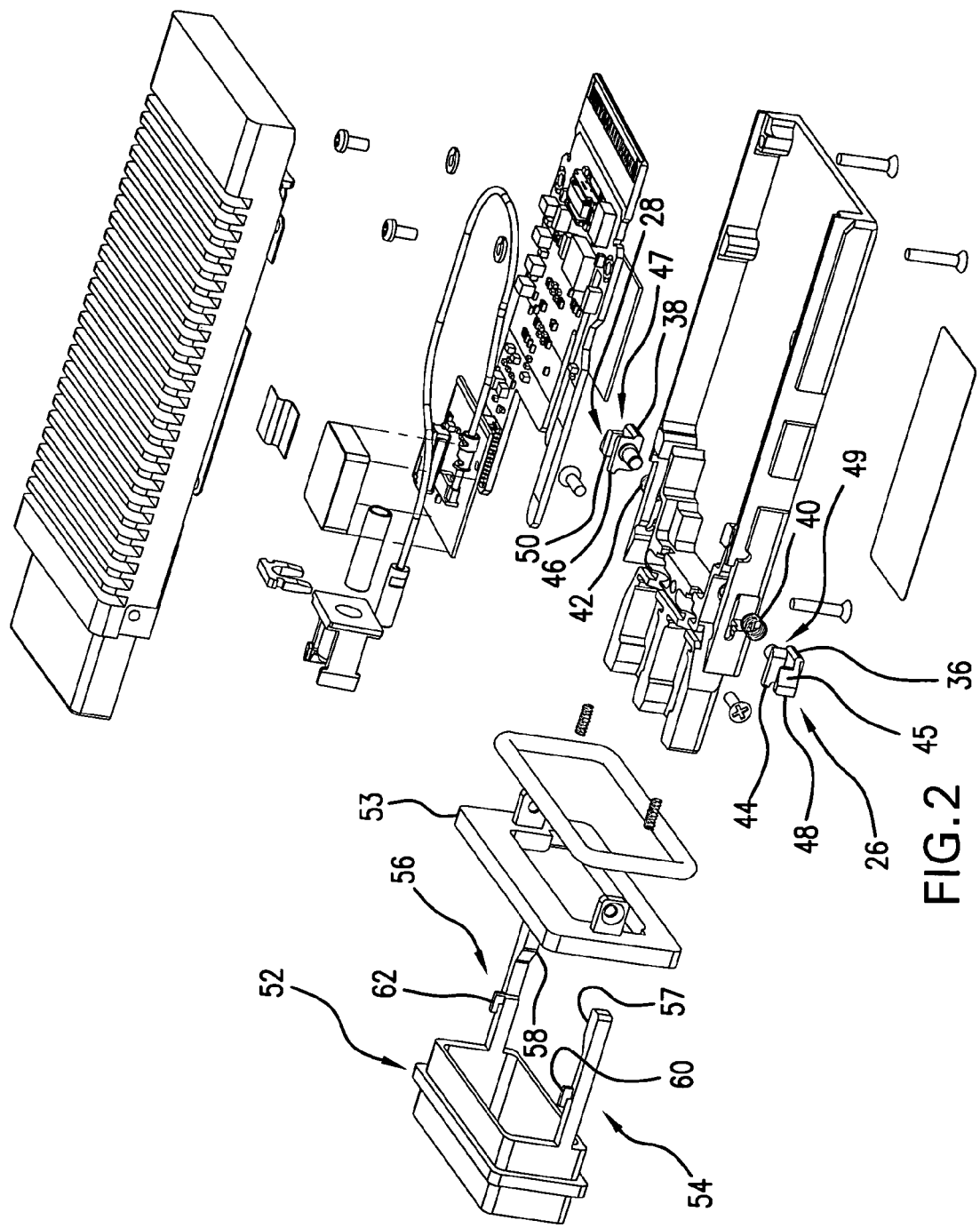
FIG. 2 is a side, perspective, exploded view of a pluggable module used by the information system of FIG. 1.

FIG. 2 shows an exploded view of the interface module 18. As shown in FIG. 2, each latch 26, 28 includes a latch body 36, 38 and a spring 40, 42 that urges the latch body 36, 38 to move outwardly, away from a body of the interface module 18 to engage the receptacles 30, 32. Included on each latch body 36, 38 is a cam follower 44, 46 and a locking projection 48, 50 that physically engages the latch aperture 30, 32. A respective channel 47, 49 separates the cam followers 44, 46 and locking projections 48, 50.

As shown in FIG. 2 is a side, perspective view of the collar 52. The collar 52 includes a pair of rearwardly extending arms 54, 56 that are rigidly attached to and extend from opposing sides of the collar 52. A cam surface 57, 58 extends inwardly from a distal end of each of the arms 54, 56. A pair of stops 60, 62 are shown on a top, center portion of the arms 54, 56.

Figure 3:
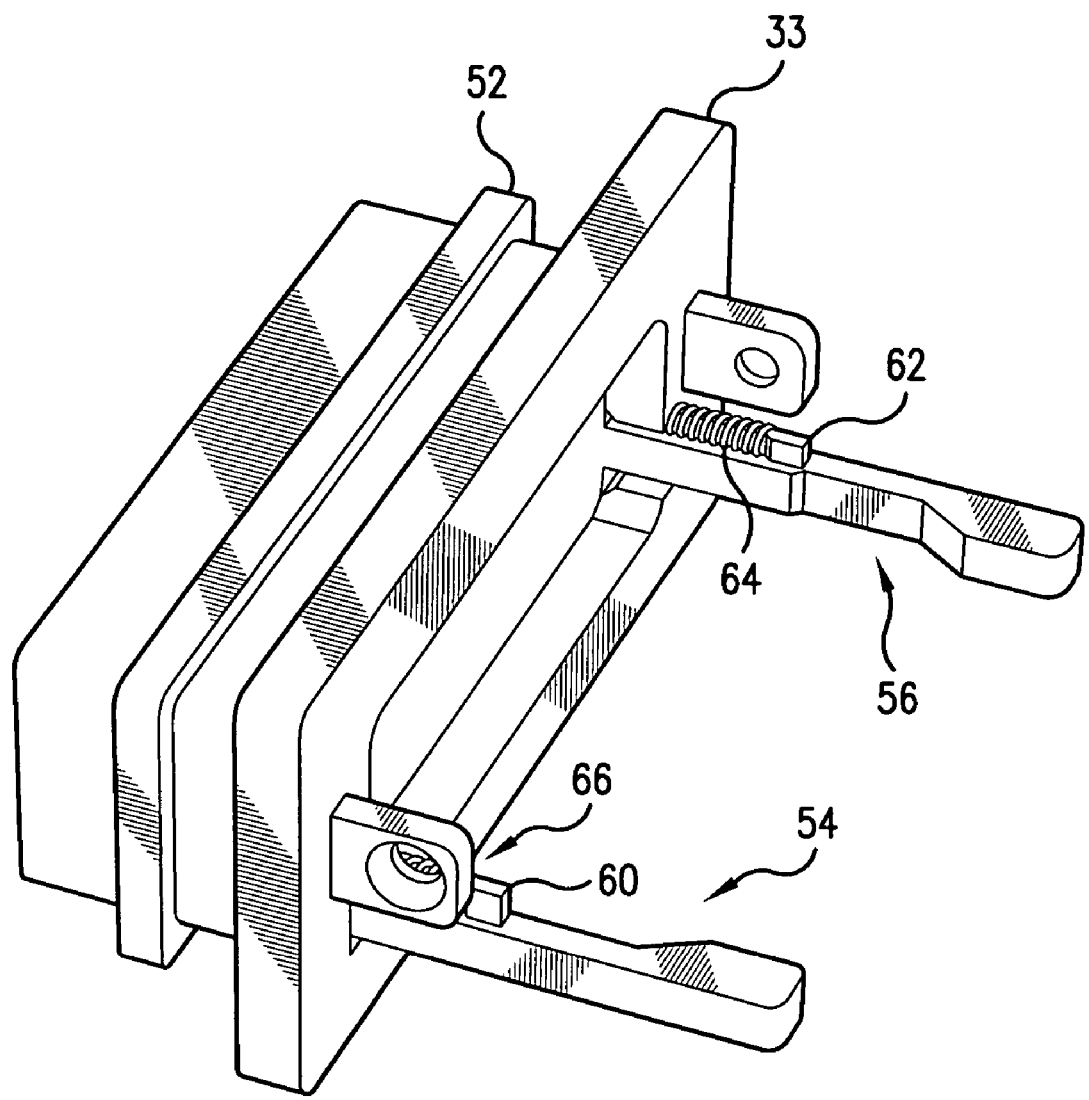
FIG. 3 is a front collar and faceplate assembly of the pluggable module of FIG. 2.

FIG. 3 shows the collar 52 assembled to the faceplate 53. As shown in FIG. 3, a set of springs 64, 66 are disposed between the stops 60, 62 and faceplate 53 to retract the collar 52 when the optical transceiver 18 is seated within the receptacle 14.

Figure 4:
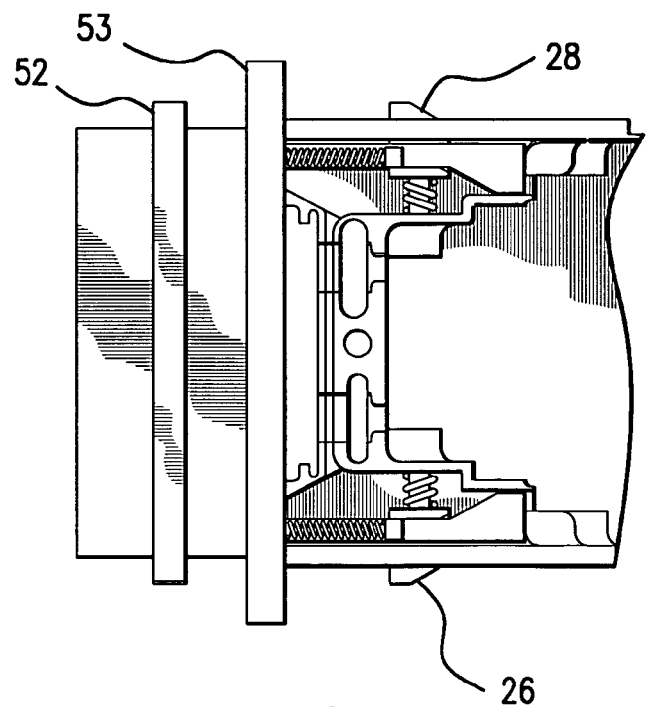
FIG. 4 is a top cut-away view of a front portion of the pluggable module of FIG. 2 with the front collar in a retracted position.
Figure 5:
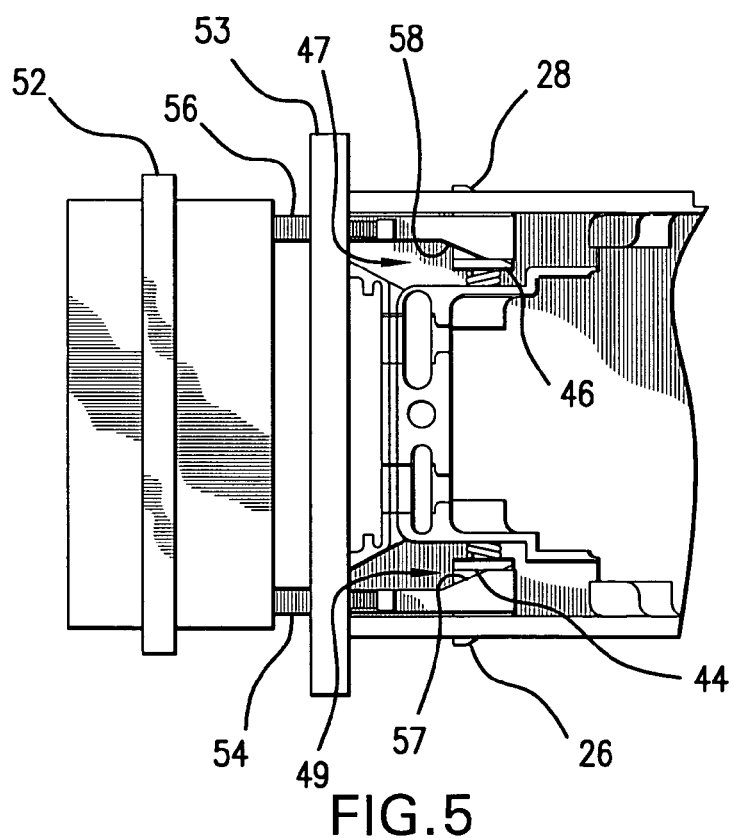
FIG. 5 is a top cut-away view of a front portion of the pluggable module of FIG. 2 with the front collar in an extended position.

FIGS. 4 and 5 show the collar 52 and operation of the latches 26, 28. FIG. 4 shows the collar 52 in a retracted state, seated against the housing of the transceiver module 18 with the latches 26, 28 extended. FIG. 5 shows the collar 52 in an extended state and the latches 26, 28 retracted.

As shown in FIG. 5, the arms 54, 56 of the collar 52 are disposed within the channels 47, 49 of the latches 26, 28. As shown in FIG. 5, when the collar 52 is pulled in a direction away from the equipment rack 12, the cam surfaces 57, 58 on the inside edges of the arms 54, 56 engage the cam followers 44, 46 and (via interaction between the cam surfaces 57, 58 and cam followers 44, 46) urge the latches 26, 28 into a retracted position.

As the latches 26, 28 reach a retracted position the stops 60, 62 fully compressed the springs 64, 66, thereby preventing any further forward movement of the collar 52 with respect to the housing 19. Via operation of the stops 60, 62 and fully compressed springs 64, 66, any further outward force on the collar 52 in a direction away from the equipment rack 12 is transmitted directly into the faceplate 53 thereby allowing the module 18 to be pulled out of the receptacle 14.

A specific embodiment of a pluggable connector has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A pluggable connector, such as an optical transceiver for coupling an information system unit to a fiber optical cable, comprising:
    a housing;
    a moveable collar disposed on an optical connector end of the housing, said collar surrounding an optical connector;
    a cam connected to said moveable collar, said cam having an active area extending parallel to an axis of movement of the moveable collar with a minimum height of the cam surface located relatively nearest the moveable collar and a maximum height of the cam surface located at a distal end of the actuator; and
    a spring loaded latch extending from a side of said housing for engaging a receptacle on the information system unit so as to secure the connector in the receptacle, said cam engaging the spring loaded latch such that when the moveable collar is in a deactivated position adjacent the housing, the minimum height of the cam is adjacent the latch and when the moveable collar is pulled in a direction away from the housing the cam moves relative to the latch from a position where the minimum height of the cam is adjacent the latch to the position where the maximum height of the cam engages and retracts the latch to enable the connector to be released from the receptacle.

2. The pluggable connector as in claim 1 wherein the cam further comprises a pair of cams connected to the collar through a pair of arms where each cam is disposed on a distal end of a respective arm of the pair of arms and where the arms extend rearwardly from opposing sides of the moveable collar parallel to an axis of movement of the moveable collar into the housing through a front plate of the housing that is rigidly attached to the housing.

3. The pluggable connector as in claim 2 further comprising a stop laterally disposed on each arm that engages the front plate where the collar is fully extended from the housing to allow the module to be pulled out of the receptacle via a continuing force on the collar.

4. The pluggable connector as in claim 3 further comprising a spring disposed between the stop and the front plate to urge the collar into a retracted position thereby allowing the spring loaded latch to extend and engage the receptacle.

5. The pluggable connector as in claim 4 wherein the spring loaded latch further comprises a latch body disposed in opposing sides of the housing perpendicular to an axis of removal of the pluggable connector from the receptacle where a locking projection on each latch body of the pair of latch bodies engages a respective lock aperture in the receptacle.

6. The pluggable connector as in claim 5 wherein the latch body further comprises a cam follower that projects from of the latch bodies and that engages and follows a profile of the cam connected to the moveable collar.

7. The pluggable connector as in claim 1 further comprising a multi-conductor plug disposed on a back end of the pluggable connector.

8. The pluggable connector as in claim 7 wherein the receptacle further comprises an electrical connector at a back of the receptacle for receiving and engaging a mating connector on the pluggable connector.

9. The pluggable connector as in claim 1 wherein the receptacle further comprises a housing that defines a cavity having an open front end for receiving at least a portion of the pluggable connector.

10. The pluggable connector as in claim 9 wherein the spring loaded latch further comprises a pair of apertures with strike plates in the receptacle that receive at least a portion of a respective pair of latching members of the pluggable connector to latch the pluggable connector inside the cavity.

11. A pluggable connector, such as an optical transceiver for coupling an information system unit to a fiber optical cable, comprising:
 a housing;
 a moveable collar disposed on an optical connector end of the housing, said collar surrounding and protecting an optical connector;
 a cam coupled to the moveable collar; and
 a spring loaded latch with an internal channel extending through the latch that separates an inside portion of the spring loaded latch from a locking projection of the spring loaded latch, said locking projection extending from a side of said housing for engaging a receptacle on the information system unit so as to secure the connector in the receptacle, said cam of said spring loaded collar extending through and internal channel on an inside portion end of the internal channel of the spring loaded latch such that when the moveable collar is pulled in a direction away from the housing a rising surface of the cam engages the inside portion end of the internal channel and retracts the locking projection to enable the connector to be released from the receptacle.

12. The pluggable connector as in claim 11 further comprises a second spring loaded latch and a pair of cams connected to the collar through a pair of arms where each cam is disposed on a distal end of a respective arm of the pair of arms where the arms extend rearwardly from opposing sides of the moveable collar parallel to an axis of movement of the moveable collar into the housing through a front plate rigidly attached to the housing and where a distal end of the respective arms extend through the respective channels of the spring loaded latches and the cams interact with the inner portions to retract the locking projections.

13. The pluggable connector as in claim 12 further comprising a stop laterally disposed on each arm that engages the front plate where the collar is fully extended from the housing to allow the module to be pulled out of the receptacle.

14. The pluggable connector as in claim 13 further comprising a spring disposed between the stop and the front plate to urge the collar into a retracted position thereby allowing the spring loaded latch to engage the receptacle.

15. The pluggable connector as in claim 14 wherein the spring loaded latch further comprises a pair of pegs disposed in opposing sides of the housing perpendicular to an axis of removal of the pluggable connector from the receptacle where each peg of the pair of pegs engages a respective peg aperture in the receptacle.

16. The pluggable connector as in claim 15 wherein the spring loaded latch further comprises a pair of pegs disposed in opposing sides of the housing perpendicular to an axis of removal of the pluggable connector from the receptacle where each peg of the pair of pegs engages a respective peg aperture in the receptacle.

17. The pluggable connector as in claim 11 further comprising a multi-conductor plug disposed on a back end of the pluggable connector.

18. The pluggable connector as in claim 17 wherein the receptacle further comprises an electrical connector at a back of the receptacle for receiving and engaging a mating connector on the pluggable connector.

19. The pluggable connector as in claim 11 wherein the receptacle further comprises a housing that defines a cavity having an open front end for receiving at least a portion of the pluggable connector.

20. The pluggable connector as in claim 19 wherein the spring loaded latch further comprises a pair of apertures with strike plates in the receptacle that receive a respective pair of latching members of the pluggable connector to latch the pluggable connector inside the cavity.

\* \* \* \* \*